United States Patent
Ito et al.

(10) Patent No.: US 9,189,034 B2
(45) Date of Patent: Nov. 17, 2015

(54) ELECTRONIC DEVICE

(71) Applicant: Panasonic Corporation, Kadoma-shi, Osaka (JP)

(72) Inventors: Naoyuki Ito, Osaka (JP); Takehiro Itotani, Osaka (JP)

(73) Assignee: Panasonic Intellectual Property Management Co., Ltd, Osaka (JP)

( * ) Notice: Subject to any disclaimer, the term of this patent is extended or adjusted under 35 U.S.C. 154(b) by 129 days.

(21) Appl. No.: 13/937,824

(22) Filed: Jul. 9, 2013

(65) Prior Publication Data
US 2014/0285446 A1    Sep. 25, 2014

(30) Foreign Application Priority Data
Mar. 25, 2013    (JP) .................................. 2013-062024

(51) Int. Cl.
    G06F 3/041    (2006.01)
    G06F 1/16     (2006.01)
    G09G 5/00     (2006.01)
(52) U.S. Cl.
    CPC ............ *G06F 1/1698* (2013.01); *G06F 1/1643* (2013.01); *G06F 1/1696* (2013.01); *G09G 5/006* (2013.01)
(58) Field of Classification Search
    CPC ......... G06F 3/044; G06F 3/046; G06F 1/044; G06F 1/046; G06F 1/0412; G06F 1/182; G06F 1/1643; G06F 1/1698; G06F 1/1626; G06F 2203/04106; G06F 2203/04107; G09G 5/006

USPC ...................... 345/76–88, 102, 171–184, 214, 345/690–692; 361/152, 692, 679.32; 701/484; 708/100
See application file for complete search history.

(56) References Cited

U.S. PATENT DOCUMENTS

| | | | |
|---|---|---|---|
| 5,495,576 A * | 2/1996 | Ritchey ........................ | 345/420 |
| 6,084,584 A * | 7/2000 | Nahi et al. .................... | 715/864 |
| 6,215,476 B1 * | 4/2001 | Depew et al. ................ | 345/173 |
| 6,504,552 B2 * | 1/2003 | Phillips ........................ | 715/726 |
| 8,878,796 B2 * | 11/2014 | Chiang ........................ | 345/173 |
| 2002/0094119 A1 * | 7/2002 | Sahadevan .................... | 382/132 |
| 2006/0222222 A1 * | 10/2006 | Fujita et al. .................. | 382/128 |
| 2007/0180207 A1 * | 8/2007 | Garfinkle ...................... | 711/162 |
| 2007/0280525 A1 * | 12/2007 | Basilico et al. .............. | 382/132 |
| 2008/0092043 A1 * | 4/2008 | Trethewey .................... | 715/705 |

(Continued)

FOREIGN PATENT DOCUMENTS

JP    2010-211577    9/2010

*Primary Examiner* — Prabodh M Dharia
(74) *Attorney, Agent, or Firm* — Hamre, Schumann, Mueller & Larson, P.C.

(57) ABSTRACT

An electronic device includes a casing to accommodate a display panel having front and back surfaces, a portion of the display surface being an effective display area; an antenna, disposed in back of a closed area of the effective display area, oriented to exhibit a directivity from the back of the effective display area toward the front surface, and to perform near field communication with an external terminal in a non-contact manner when the external terminal is close to the display panel; a scanner, disposed in the back of the effective display area, having a digitizer scanning film for accepting an input of a digitizer pen, to detect a position of the digitizer pen on the front surface of the display panel; and a shielding plate disposed in back of the scanner and the antenna such that the antenna is disposed between the digitizer scanning film and the shielding plate.

6 Claims, 5 Drawing Sheets

(56) References Cited

U.S. PATENT DOCUMENTS

| | | | |
|---|---|---|---|
| 2008/0191009 A1* | 8/2008 | Gressel et al. | 235/382 |
| 2009/0137204 A1* | 5/2009 | Chang | 455/41.1 |
| 2009/0141008 A1* | 6/2009 | Johnson et al. | 345/179 |
| 2009/0184942 A1* | 7/2009 | Wong et al. | 345/175 |
| 2010/0025942 A1* | 2/2010 | Mangaroo et al. | 277/638 |
| 2010/0090002 A1* | 4/2010 | Mochizuki et al. | 235/383 |
| 2012/0105324 A1* | 5/2012 | Lee et al. | 345/157 |
| 2012/0169642 A1* | 7/2012 | Lee | 345/173 |
| 2013/0128621 A1* | 5/2013 | Liao | 362/634 |
| 2013/0157729 A1* | 6/2013 | Tabe | 455/573 |
| 2013/0162594 A1* | 6/2013 | Paulsen et al. | 345/174 |
| 2013/0257713 A1* | 10/2013 | Yamada | 345/156 |
| 2014/0035587 A1* | 2/2014 | Nielsen et al. | 324/329 |
| 2014/0065948 A1* | 3/2014 | Huang | 455/7 |
| 2014/0183269 A1* | 7/2014 | Glaser | 235/492 |
| 2014/0188399 A1* | 7/2014 | Valenzuela | 702/19 |
| 2014/0253463 A1* | 9/2014 | Hicks | 345/173 |
| 2014/0253522 A1* | 9/2014 | Cueto | 345/179 |
| 2014/0304004 A1* | 10/2014 | Trethewey | 705/3 |
| 2015/0041786 A1* | 2/2015 | Li et al. | 257/40 |

* cited by examiner

ELECTRONIC DEVICE

BACKGROUND

1. Field

The present disclosure relates to electronic devices including digitizers and electromagnetic induction devices.

2. Description of the Related Art

An electronic device having an RFID (Radio Frequency IDentification) antenna disposed on a display screen is disclosed in Japanese Laid-Open Patent Publication No. 2010-211577.

SUMMARY

The present disclosure is to make available an electronic device including a digitizer and an electromagnetic induction device.

Therefore, an electronic device of the present disclosure includes a display panel. Further, the electronic device of the present disclosure includes an antenna, disposed in back of an effective display area of the display panel, configured to be oriented so as to exhibit a directivity from the back of the effective display area of the display panel toward a front surface that acts as a display surface of the display panel, and to perform near field communication with an external terminal close to the display panel. Further, the electronic device of the present disclosure includes a scanner, disposed in the back of the effective display area of the display panel, configured to have a plurality of scanning elements on a front surface, and to detect a position of an object on the front surface of the display panel. Further, the electronic device of the present disclosure includes a shielding plate disposed in back of the scanner and the antenna, and having ground connection to the scanner. Further, the electronic device of the present disclosure includes a casing in which the display panel, the antenna, the scanner, and the shielding plate are layered.

In the features described above, the electronic device according to the present disclosure has a structure in which both detection of positional information of an object on a front surface of a display panel and non-contact wireless communication with an external terminal that is close to the front surface of the display panel can be advantageously performed.

DETAILED DESCRIPTION

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

Hereinafter, a clamshell type personal computer (PC) 1 will be described as an example of an electronic device of the present disclosure.

[Structure of Clamshell Type Computer]

Figure 1:
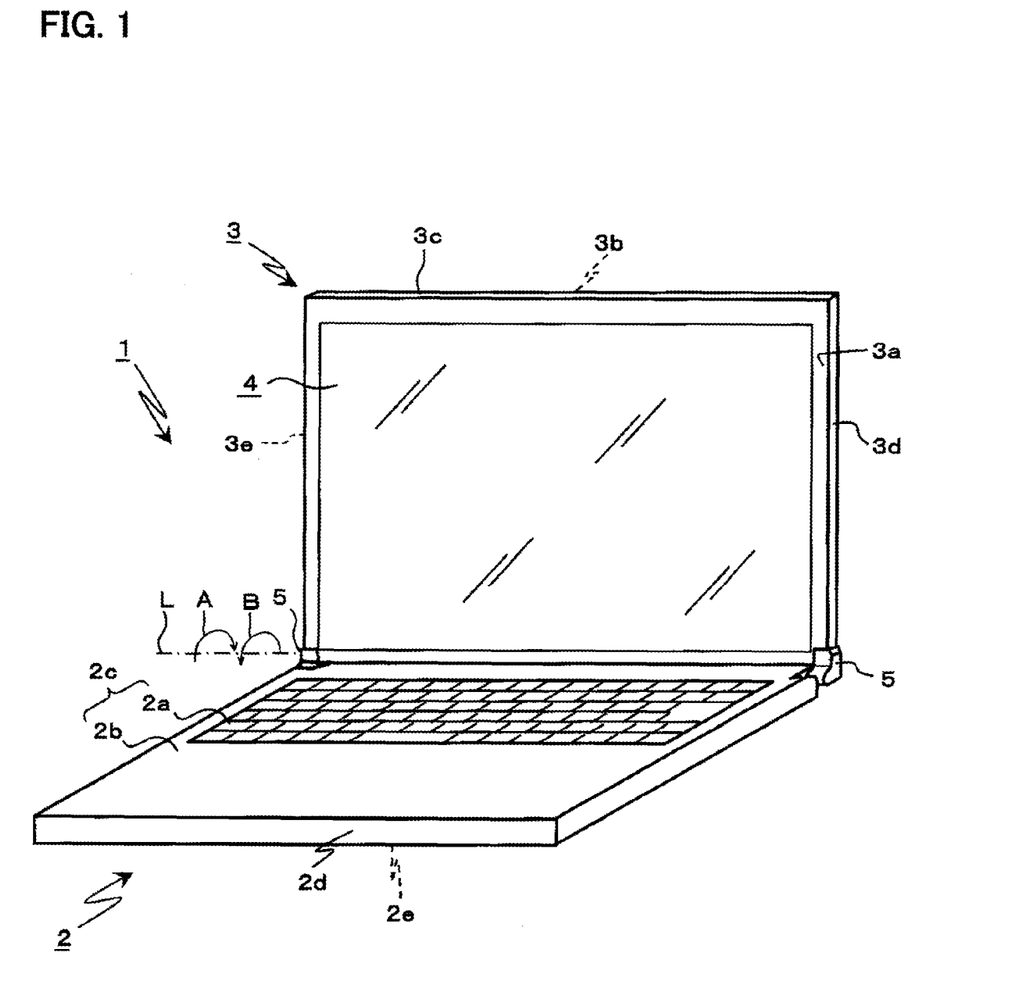
FIG. 1 is a perspective view of a clamshell type personal computer (PC)

FIG. 1 is a perspective view of the PC 1. The PC 1 includes a first casing 2, a second casing 3, and a hinge portion 5 that supports the first casing 2 and the second casing 3 such that the first casing 2 and the second casing 3 are rotatable.

The first casing 2 includes a top surface 2c having a keyboard 2a and a palm rest 2b formed therein. Further, the first casing 2 includes a front surface 2d and a back surface 2e. The second casing 3 includes a front surface 3a having a display section 4 disposed therein. Further, the second casing 3 includes a back surface 3b reverse to the front surface 3a. The second casing 3 includes an upper-side surface 3c located above the display section 4, a the right-side surface 3d located to the right of the display section 4, and a left-side surface 3e located to the left of the display section 4, as viewed by a user of the PC 1 who views the display section 4 from the front thereof. The terms "upper", "lower", "front", and "back" for the PC 1 are based on a direction in which the PC 1 is viewed by a user operating the PC 1, as shown in FIG. 1.

In the top surface 2c, for example, a pointing device used for changing a position of a cursor or the like displayed on a liquid crystal panel 4b may be disposed. Further, the palm rest 2b allows a user to rest palms thereon when the user taps on the keyboard 2a. In side surfaces that connect between the top surface 2c and the back surface 2e of the first casing 2, terminals such as a USB (Universal Serial Bus) connection port for connecting to an external device, a LAN (Local Area Network) connection port, and a terminal used for driving the PC 1 or charging a secondary batter through an adaptor by using a commercial power supply, can be provided. Further, drives for a hard disk and an optical disc for storing data of the PC 1, a circuit substrate having mounted therein electronic components for controlling the PC 1, a secondary battery, and the like are disposed between the top surface 2c and the back surface 2e of the first casing 2.

The second casing 3 may be provided with a driving circuit substrate for driving the liquid crystal panel 4b. The liquid crystal panel 4b is one example of a display panel, and an organic electroluminescence panel or the like may be used instead of the liquid crystal panel 4b.

The hinge portion 5 is a hinge including an opening and closing hinge mechanism. The hinge portion 5 opens and closes so as to switch between a state where the front surface 3a is closest to the top surface 2c, and a state where the front surface 3a is open relative to the top surface 2c as shown in FIG. 1, by rotating about an axis L in a direction indicated by an arrow A and a direction indicated by an arrow B.

Hereinafter, the embodiment will be described by using the PC 1 shown in FIG. 1 as an example.

(Embodiment 1)

Figure 2:
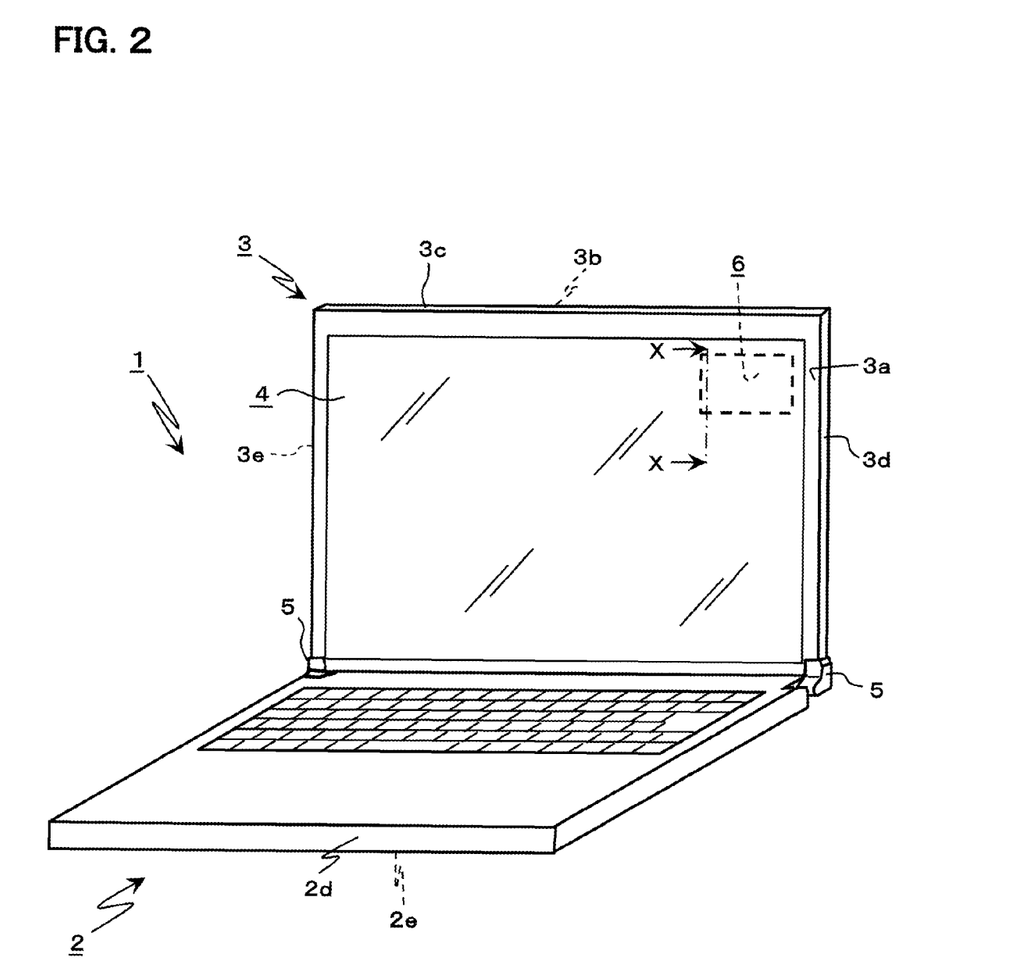
FIG. 2 is a perspective view of a PC according to one embodiment.

FIG. 2 illustrates a structure of the PC 1 according to the present embodiment. A portion of components that are substantially the same as shown in FIG. 1 is not shown in FIG. 2 in order to prevent the drawings from being complicated.

Figure 3:
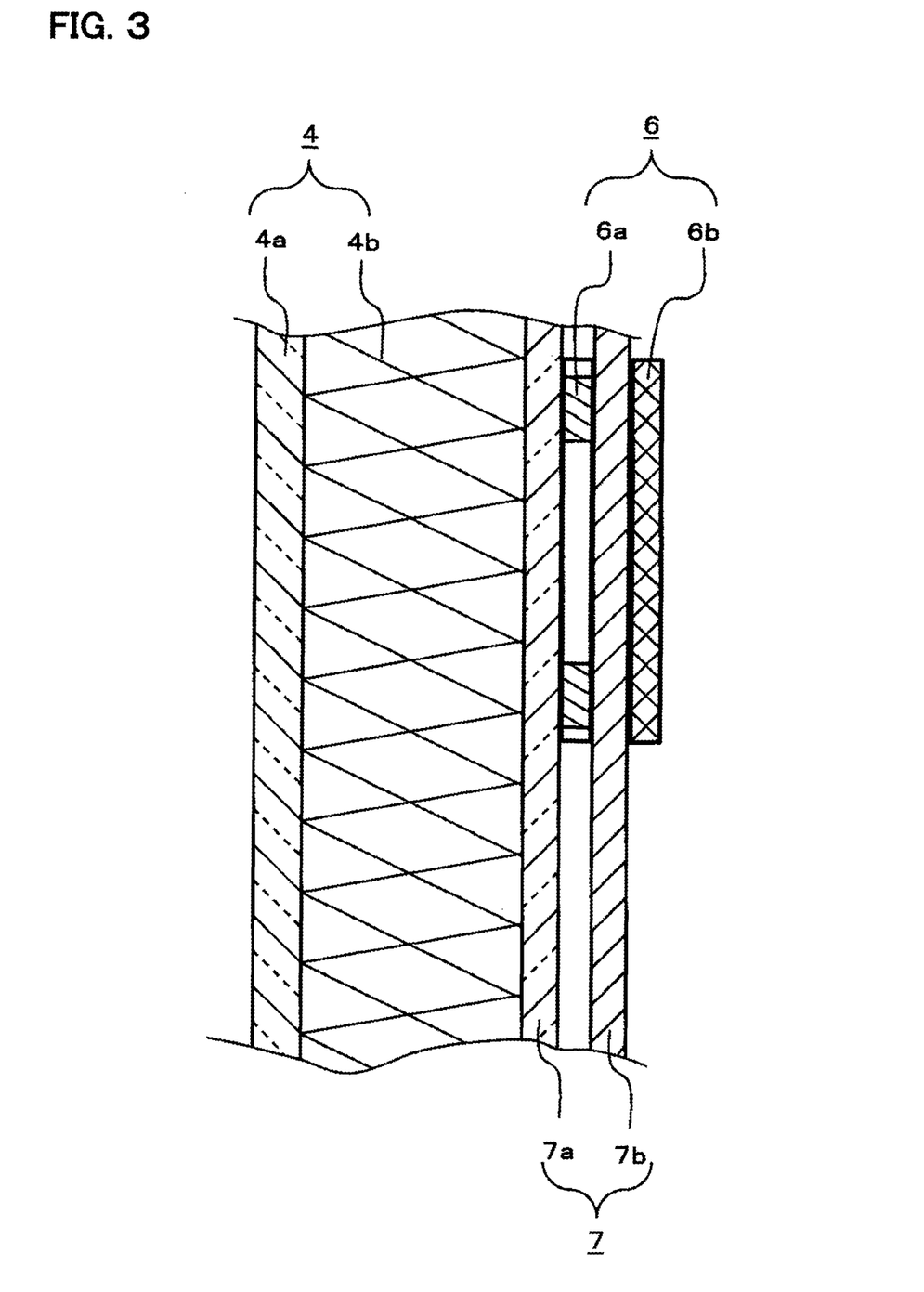
FIG. 3 is a cross-sectional view of a main portion of the PC.

FIG. 3 is a fragmentary view, of a cross-section of a vicinity of the display section 4 shown in FIG. 2, taken in the direction of arrows X-X.

[Positioning of RFID Module in Clamshell Type Computer]

The PC 1 of the present embodiment includes an RFID (Radio Frequency IDentification) module 6. The RFID module 6 is disposed in the back of an effective display area of the liquid crystal panel 4b. The RFID module 6 is disposed near the corner formed by the upper-side surface 3c and the right-side surface 3d as viewed from the front of the PC 1. The RFID module 6 includes an antenna 6a and a signal processing section 6b. The antenna 6a is used to communicate information with an external terminal close to the antenna 6a, by near field communication, in a non-contact state. The signal processing section 6b processes a signal which is communicated by the near field communication by the antenna 6a. In the present embodiment, the external terminal with which the RFID module 6 communicates by the near field communication is, for example, an RFID tag. The RFID module 6 performs transmission and reception of information signals with the RFID tag, in a non-contact manner, and processes the information signals. An appropriate frequency at which the RFID module and the RFID tag communicate is 13.56 MHz, which is a frequency in compliance with the ISO 14443 standard. Further, the area of the antenna 6a has a roughly rectangular shape that is 3 cm long and 5 cm wide. A communication distance used with the RFID tag in the present embodiment is about 1 cm. This is a communication distance with a typical RFID tag. When the RFID tag is moved so as to be close to the surface of a glass 4a, the RFID tag and the RFID module 6 are allowed to communicate with each other. The area and shape of the antenna 6a are not limited to the value and the shape described above. For example, the area and shape of the antenna 6a may be determined according to the area and shape of the RFID tag.

The antenna 6a of the RFID module 6 is disposed in the back of the liquid crystal panel 4b so as to orient the antenna 6a toward a user from behind the display section 4 for exhibiting its directivity, in the case of the user viewing the liquid crystal panel 4b. As shown in FIG. 3, in the present embodiment, the antenna 6a is disposed opposite to the glass 4a across the liquid crystal panel 4b. When, as in the present embodiment, the antenna 6a is disposed on the effective display area of the liquid crystal panel 4b, the antenna 6a can be overlaid on display information of the liquid crystal panel 4b. Therefore, for example, a position of the antenna 6a may be indicated on the display information, thereby improving usability for a user. Further, the signal processing section 6b that codes and/or decodes wireless radio signals transmitted and received by the antenna 6a, is disposed opposite to the glass 4a across the liquid crystal panel 4b so as to be aligned with the antenna 6a. The antenna 6a and the signal processing section 6b are connected to each other by a signal line disposed via an edge face of a shielding plate 7b (described below) in the right-side surface 3d of the display section 4. The antenna 6a and the signal processing section 6b may be disposed with respect to the liquid crystal panel 4b in a portion other than the vicinity of the corner formed by the upper-side surface 3c and the right-side surface 3d as shown in FIG. 2.

The display section 4 in the second casing 3 of the PC 1 has the glass 4a disposed on a surface on a side on which a user views the liquid crystal panel 4b. For the liquid crystal panel 4b, for example, a typical end face illumination mode is used in which light from a light source disposed on the left-side surface 3e side is applied to a liquid crystal surface, by a light guide plate formed by a resin. In this configuration, interference between the signal processing section 6b and a control section for controlling, for example, whether the light source is to be on or off, is reduced. Further, for example, a reflector, formed by a resin, for guiding, to the liquid crystal surface, light reflected by the light guide plate, is disposed on a surface of the liquid crystal panel 4b which opposes the glass 4a across the liquid crystal panel 4b. Thus, the liquid crystal panel 4b of the display section 4 has a structure in which the glass 4a is disposed on a surface (in a direction in which the liquid crystal panel 4b performs display) viewed by a user, and the reflector or the like is disposed on the surface (the back surface of the liquid crystal panel 4b) of the liquid crystal panel 4b which opposes the glass 4a across the liquid crystal panel 4b. Hereinafter, the back surface of the liquid crystal panel 4b on which the reflector or the like is disposed in the liquid crystal panel 4b is referred to as a "reflector side".

[Positioning of Digitizer in Clamshell Type Computer]

The digitizer 7 includes a digitizer film 7a and a shielding plate 7b. The digitizer film 7a is one example of a scanner having a plurality of scanning elements on the front surface. The digitizer film 7a senses a position of a digitizer pen (also referred to as an electronic pen or the like) when the digitizer pen or a finger of a person is moved so as to be close to the glass 4a, to obtain positional information of the digitizer pen. The positional information is subjected to signal processing by a digitizer control section (described below) 7c. The positional information having been subjected to the signal processing is inputted to a CPU 10 as, for example, a trajectory of the digitizer pen. In the present embodiment, as shown in FIG. 3, the digitizer film 7a is disposed in the back of the liquid crystal panel 4b such that the digitizer film 7a is closer to the liquid crystal panel 4b than the antenna 6a is. The shielding plate 7b shields the digitizer film 7a from electromagnetic waves. Therefore, the shielding plate 7b is formed by an electrically-conductive material, and has a ground potential equal to that of the digitizer film 7a. The digitizer film 7a is disposed between the liquid crystal panel 4b and the antenna 6a. In the present embodiment, the digitizer film 7a has an area equal to the effective display area of the liquid crystal panel 4b. In this structure, ranges in which the digitizer film 7a and the liquid crystal panel 4b, respectively, operate, can be defined. Further, in the present embodiment, since the digitizer pen is used for input, an electrically-conductive magnetic material is used for a material of the shielding plate 7b.

[Layering of Electromagnetic Induction Device and Digitizer]

On the display section 4 of the PC 1, the digitizer film 7a, the antenna 6a, and the shielding plate 7b are layered. The antenna 6a performs transmission and reception of information signals with the RFID tag in a non-contact manner. Therefore, if an electric conductor formed by a metal or the like is located in a direction in which the antenna 6a opposing the RFID tag is oriented so as to exhibit its directivity, a radio signal is blocked by the electric conductor. As a result, transmission and reception of radio signals between the antenna 6a and the RFID tag become difficult. On the other hand, the shielding plate 7b of the digitizer 7 is electrically conductive as described above, and blocks a radio signal. Therefore, if the shielding plate 7b is disposed in the direction in which the antenna 6a is oriented so as to exhibit its directivity, the transmission and reception of information signals with the RFID tag become difficult. Therefore, in the present embodiment, the antenna 6a is disposed between the digitizer film 7a and the shielding plate 7b.

Further, if the signal processing section 6b is disposed between the digitizer film 7a and the shielding plate 7b, the digitizer 7 may be affected by, for example, leakage of electric signals which are generated when coding or decoding is performed by the signal processing section 6b. On the other hand, the signal processing section 6b that codes or decodes an information signal transmitted or received by the antenna 6a, is connected to the antenna 6a by the signal line as described above. Therefore, as shown in FIG. 3, the signal processing section 6b is disposed in the back of the shielding plate 7b. Thus, also when the RFID module 6 and the digitizer 7 are layered over the liquid crystal panel 4b, the RFID module 6 is allowed to assuredly communicate information signals from the outside with the RFID tag, and the digitizer 7 is allowed to assuredly communicate the positional information of the digitizer pen which is obtained through the glass 4a. The back of the shielding plate 7b is not limited to the back surface of the shielding plate 7b. The signal processing section 6b may be spaced from the shielding plate 7b. However, in order to reduce the size of the PC 1, or facilitate wiring of a cable connecting between the antenna 6a and the signal processing section 6b, the signal processing section 6b is preferably disposed on the back surface of the shielding plate 7b.

In the cross-sectional view shown in FIG. 3, positional relationship of the components of the RFID module 6 and the components of the digitizer 7 relative to each other, is merely illustrated. Therefore, for example, although the digitizer film 7a and the shielding plate 7b, which oppose each other across the antenna 6a, are spaced from each other in FIG. 3, the digitizer film 7a and the shielding plate 7b are in close contact with each other except for portions corresponding to the antenna 6a, in practice. Further, the thicknesses of the antenna 6a, the signal processing section 6b, the digitizer film 7a, and the shielding plate 7b are conceptually illustrated, and may be different from actual thicknesses.

[Driving of Electromagnetic Induction Device and Digitizer]

Figure 4:
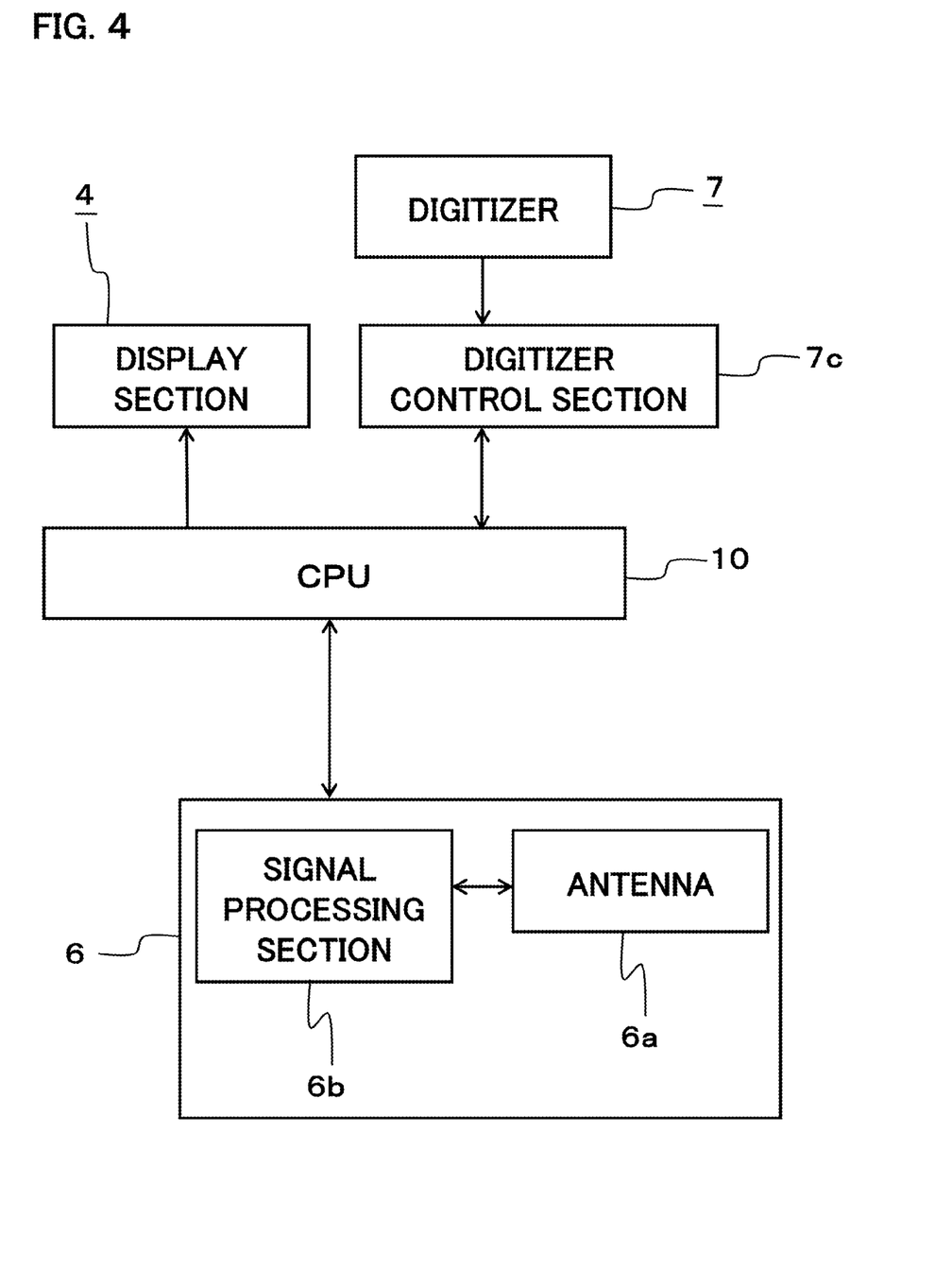
FIG. 4 is a block circuit diagram illustrating the main portion of the PC.

A drive circuit that drives the RFID module 6 and the digitizer 7 layered over the display section 4 as described above will be described. FIG. 4 is a block diagram illustrating the drive circuit.

A signal representing the positional information of the digitizer pen that has contacted with the glass 4a is detected by the digitizer 7. The signal representing the positional information is processed, by the digitizer control section 7c, so as to allow the CPU (Central Processing Unit) 10 to identify the signal. The CPU 10 controls the PC 1 based on the positional information. This control includes image processing for an image displayed on the display section 4. For example, the positional information is processed, by the CPU 10, as a signal indicating a coordinate of a mouse cursor.

The antenna 6a performs transmission and reception of information signals with the RFID tag. The signal processing section 6b decodes the information signal received by the antenna 6a into a signal that can be identified by the CPU 10, or codes an output signal of the CPU 10 into an information signal to be stored in an external RFID tag. The CPU 10 outputs the decoded signal as a display signal to the display section 4. The decoded information signal may be stored as, for example, data in a hard disk of the PC 1 without outputting the signal to the display section 4, depending on a type of the decoded information signal. On the other hand, when an information signal is transmitted from the PC 1 to the RFID tag, the CPU 10 controls the signal processing section 6b so as to code the information signal, and transmits the coded signal to the RFID tag via the antenna 6a.

A case where the antenna 6a receives an information signal of the RFID tag, in the display section 4 over which the RFID module 6 and the digitizer 7 are layered, will be described. When the antenna 6a receives an information signal of the RFID tag, the received signal is decoded into a signal that can be identified by the CPU 10 as described above. The antenna 6a is disposed so as to partially overlap the digitizer film 7a as shown in FIG. 3. Therefore, the CPU 10 performs control so as to issue, to the digitizer control section 7c of the digitizer 7, such an instruction as to cause the digitizer control section 7c to cancel communication of the positional information of the digitizer pen in the PC 1. Thus, the digitizer 7 is less likely to malfunction when the RFID tag is moved so as to be close to the PC 1. In another case, when the antenna 6a receives an information signal of the RFID tag, the CPU 10 performs control so as to issue, to the digitizer control section 7c of the digitizer 7, such as instruction as to cause the digitizer control section 7c to cancel a portion of processing which is performed, based on the positional information detected by the digitizer film 7a, for an image displayed on the display section 4. For example, a process of preventing, in a state where a mouse cursor is moved so as to follow a position detected by the digitizer film before the antenna 6a receives the information signal of the RFID tag, the mouse cursor from being moved so as to follow the position, is performed. Thus, when the RFID tag is moved so as to be close to the PC 1, the PC 1 is less likely to malfunction. In another case, the CPU 10 can inform a user that the RFID tag is detected as being moved so as to be close to the PC 1.

In the above description, the antenna 6a receives an information signal of the RFID tag. However, the same applies to a case where the PC 1 transmits an information signal to the RFID tag.

[Effects and the Like]

In the present embodiment, the antenna 6a and the digitizer film 7a are disposed in the back of the effective area of the liquid crystal panel 4b, and further the shielding plate 7b is disposed in the back of both the antenna 6a and the digitizer film 7a. Thus, as described above, also in the PC 1 including the digitizer 7, the antenna 6a is not shielded by the shielding plate 7b, and can perform near filed communication with the RFID tag that is an external terminal In the present embodiment, the digitizer film 7a is layered over the liquid crystal panel 4b such that the digitizer film 7a is closer to the liquid crystal panel 4b than the antenna 6a is. Thus, a sensitivity of the digitizer film 7a is less likely to be affected by the antenna 6a, thereby enhancing a detection accuracy for detecting a position of the digitizer pen or the like.

Figure 5:
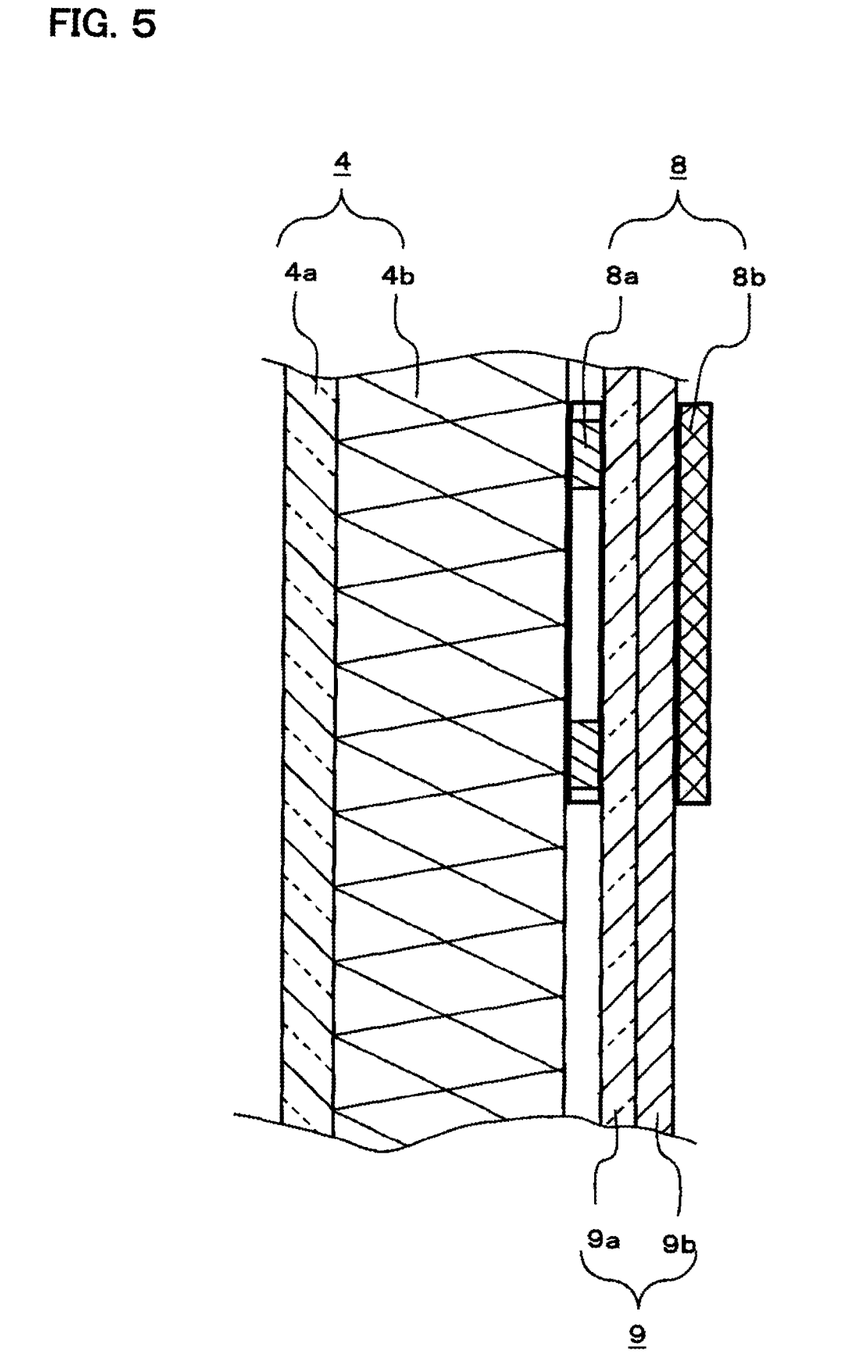
FIG. 5 is a cross-sectional view of a main portion of a PC according to another embodiment.

In the present embodiment, the digitizer film 7a is layered over the liquid crystal panel 4b such that the digitizer film 7a is closer to the liquid crystal panel 4b than the antenna 6a is. However, the present disclosure is not limited thereto. For example, as shown in FIG. 5, an antenna 8a may be layered over the liquid crystal panel 4b such that the antenna 8a is closer to the liquid crystal panel 4b than a digitizer film 9a is, In the present embodiment, the signal processing section 6b that processes a signal communicated by the antenna 6a by near field communication is disposed in the back of the shielding plate 7b. Thus, as described above, the digitizer 7 is less likely to be affected by, for example, leakage of an electric signal processed by the signal processing section 6b.

In the present embodiment, when the antenna 6a receives an information signal of the RFID tag, the CPU 10 issues, to the digitizer control section 7c of the digitizer 7, an instruction for canceling communication of positional information of the digitizer pen to the CPU 10 in the PC 1. Thus, when the RFID tag is moved so as to be close to the PC 1, the digitizer 7 is less likely to malfunction.

In the present embodiment, when the antenna 6a receives an information signal of the RFID tag, the CPU 10 performs control so as to issue, to the digitizer control section 7c of the digitizer 7, such an instruction as to cause the digitizer control section 7c to halt a portion of processing which is performed, based on positional information, for an image displayed on the display section 4. Thus, when the RFID tag is moved so as to be close to the PC 1, the PC 1 is less likely to malfunction. In another case, the CPU 10 can inform a user that the RFID tag is detected as being moved so as to be close to the PC 1.

In the embodiment described above, the RFID tag, which is in compliance with the ISO 14443 standard, is described as an example of an external terminal that can be detected in a non-contact manner by using an electromagnetic induction device. However, the external terminal may be an external terminal which is in compliance with another standard.

Further, an antenna having a roughly rectangular shape that is 3 cm long and 5 cm wide is described as an example of the antenna. However, this is one example. An antenna that has an area and a shape conforming to those of an external terminal which is moved so as to be close to the antenna, can be used.

Further, an object to be detected by the digitizer film is not limited to a digitizer pen that operates by electromagnetic induction. An object to be detected by the digitizer film may be, for example, an object, such as a plastic and a user's finger, to be detected by electrostatic induction, or an object to be detected by electrostatic induction and electromagnetic induction.

Further, in the present embodiment, a clamshell type computer is described. However, this is one example. The technique of the present disclosure is applicable to tablet-type computers, convertible computers that can switch between a clamshell type computer and a tablet-type computer, stationary computers, and the like. Further, the electronic device of the present disclosure is not limited to computers, and may be, for example, mobile telephones, registers, inventory management terminals, medical device terminals, and the like.

As presented above, one embodiment has been described as an example of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiment has been described to exemplify the technology according to the present disclosure, and therefore, various modifications, replacements, additions, and omissions may be made within the scope of the claims and the scope of the equivalents thereof.

What is claimed is:

1. An electronic device, comprising:
   a casing configured to accommodate:
   a display panel having a front surface and a back surface, the front surface being a display surface, a portion of the display surface being an effective display area;
   an antenna, disposed in back of a closed area of the effective display area, the antenna being oriented so as to exhibit a directivity from the back of the effective display area toward the front surface, the antenna configured to perform near field communication with an external terminal in a non-contact manner when the external terminal is close to the display panel;
   a scanner, disposed in the back of the effective display area, the scanner being configured to have a scanning film on a front surface, the scanning film being a digitizer scanning film for accepting an input of a digitizer pen, and to detect a position of the digitizer pen on the front surface of the display panel;
   a shielding plate disposed in back of the scanner and the antenna such that the antenna is disposed between the digitizer scanning film and the shielding plate, and having a ground connection to the scanner, and
   the display panel, the antenna, the scanner, and the shielding plate being layered in the casing.

2. The electronic device according to claim 1, wherein the scanner is layered over the display panel such that the scanner is closer to the display panel than the antenna is.

3. The electronic device according to claim 1, further comprising a signal processing section, disposed in back of the shielding plate, configured to process a signal communicated by the antenna by near field communication.

4. The electronic device according to claim 1, further comprising a CPU configured to perform control based on a position of the digitizer pen detected by the scanner, wherein
   the CPU cancels a portion of the control based on the position of the digitizer pen detected by the scanner, when the antenna performs near field communication with the external terminal.

5. The electronic device according to claim 1, further comprising a CPU configured to perform processing for an image to be displayed on the display panel, based on a position of the digitizer pen detected by the scanner, wherein
   the CPU performs control so as not to perform the processing for the image to be displayed on the display panel based on the position of the digitizer pen detected by the scanner, when the antenna performs near field communication with the external terminal.

6. The electronic device according to claim 1, wherein the antenna is an RFID module.

* * * * *